United States Patent
White

(10) Patent No.: US 7,108,304 B2
(45) Date of Patent: Sep. 19, 2006

(54) GRILLING IMPLEMENT AND METHOD OF USE THEREOF

(76) Inventor: Travis White, 87 Rogers St., Atlanta, GA (US) 30317

( * ) Notice: Subject to any disclaimer, the term of this patent is extended or adjusted under 35 U.S.C. 154(b) by 0 days.

(21) Appl. No.: 10/984,260

(22) Filed: Nov. 9, 2004

(65) Prior Publication Data
US 2006/0097529 A1 May 11, 2006

(51) Int. Cl.
F24B 15/00 (2006.01)

(52) U.S. Cl. ............................ 294/10; 294/12; 294/14; 294/26

(58) Field of Classification Search ............. 294/9–12, 294/14, 24, 26; 7/110, 112
See application file for complete search history.

(56) References Cited

U.S. PATENT DOCUMENTS

| | | | |
|---|---|---|---|
| 465,865 A | 12/1891 | Kuhn | |
| 554,150 A | 2/1896 | Smith | |
| 828,012 A * | 8/1906 | Armstrong | .................... 294/24 |
| 1,587,350 A | 6/1926 | Parke | |
| 2,597,477 A | 5/1952 | Haislip | |
| 2,747,911 A | 5/1956 | Kuever | |
| 2,824,323 A | 2/1958 | Tos et al. | |
| 3,162,475 A * | 12/1964 | Van Allen | .................... 294/26 |
| 3,820,185 A | 6/1974 | Phillips | |
| 4,112,537 A | 9/1978 | Heuck | |
| 4,168,856 A * | 9/1979 | Rhoades | ........................ 294/8 |
| 4,176,417 A | 12/1979 | Ruff | |
| 4,222,599 A | 9/1980 | Gale et al. | |
| 4,282,625 A | 8/1981 | Hulett | |
| 4,471,985 A | 9/1984 | Mahoney | |
| 4,482,181 A | 11/1984 | Shepherd | |
| D282,518 S | 2/1986 | Mahoney | |
| 4,668,302 A | 5/1987 | Kolodziej et al. | |
| 4,801,166 A | 1/1989 | Jordan et al. | |
| 4,889,375 A * | 12/1989 | Leu | .............................. 294/10 |
| D341,065 S | 11/1993 | Martner | |
| D341,297 S | 11/1993 | Martner | |
| 5,314,220 A * | 5/1994 | Clement | ....................... 294/10 |
| 5,566,538 A * | 10/1996 | Frazier et al. | ................. 56/239 |
| 5,729,854 A | 3/1998 | Powers | |
| 5,896,668 A * | 4/1999 | Murrell | ........................ 30/322 |
| 6,000,739 A | 12/1999 | Zemit et al. | |
| 6,039,372 A | 3/2000 | Noe et al. | |
| 6,068,314 A | 5/2000 | Dorazio et al. | |
| 6,260,896 B1 | 7/2001 | Dozier | |
| 6,422,623 B1 * | 7/2002 | Thomas | ........................ 294/24 |
| 6,460,910 B1 * | 10/2002 | Prass | ............................ 294/24 |
| 6,485,074 B1 | 11/2002 | Floyd | |
| 6,598,297 B1 * | 7/2003 | Matt | ............................. 30/142 |

(Continued)

Primary Examiner—Dean J. Kramer
(74) Attorney, Agent, or Firm—Williamson Intellectual Property Law, LLC; Thomas R. Williamson, III

(57) ABSTRACT

A grilling implement and method of use thereof, the grilling implement comprising at least one hook having a tip, a shaft and a heel. The shaft and heel lie coplanar, and the tip curves upward out of the plane of the shaft and heel such that the hook can be passed under the tines of a grill grate, and the tip thereof maneuvered over the grill tines to securely hold the grate. The grilling implement further comprises at least one bar lying coplanar with the heel and shaft of the hook, wherein the bar supports the grill grate when rotated under the tines of the grate. The grilling implement can also be utilized to maneuver charcoal briquettes or break apart natural charcoal logs.

10 Claims, 3 Drawing Sheets

U.S. PATENT DOCUMENTS 6,643,888 B1  11/2003  Griffith 6,752,441 B1 *  6/2004  Morris ........................ 294/12

* cited by examiner

GRILLING IMPLEMENT AND METHOD OF USE THEREOF

TECHNICAL FIELD

The present invention relates generally to grilling tools, and more specifically to a grilling implement for handling and/or manipulating coals, grill grates, grill lids, and the like.

BACKGROUND OF THE INVENTION

There are a multitude of grilling implements available for manipulation of foodstuffs on a cooking grill. However, it is often necessary during grilling operations to perform functions other than manipulation of foodstuffs. Such other functions may include opening of the grill, removal of the grill grate, and/or maneuvering coals.

For instance, grills often have lids or covers that must be removed while quite hot to gain access to foodstuffs lying upon the grill grate. Furthermore, upon removal of the lid, there are occasions when it is necessary to remove the grill grate for access to, and/or manipulation of, the heat source below (i.e. charcoal, volcanic rock, wood chips and the like). However, if food has been placed upon the grill grate, it is imperative that the grill grate be removed carefully, so as to avoid spillage of the food therefrom. While various hook devices may be utilized to remove a grill grate, such devices, do not inadequately maintain the grill grate in a level position so as to facilitate maintenance of food stuffs thereon.

For instance, pokers with curved ends have been utilized for lifting of hot lids from stoves. However, such devices lack a means for support of a grill grate in a level position and further lack a curvature to the hook end to securely retain the grill grate.

Following removal of a grill grate, it is often necessary and/or desirable to maneuver charcoal briquettes, volcanic rocks or natural charcoal pieces located within the grill in order to provide uniform heat, and enhance airflow therethrough, so that cooking operations can be carried out with predictability. In order to correctly position charcoal briquettes, it is necessary to have a device that can properly grasp, handle and manipulate the briquettes so as to obtain the desired location and position of same.

Some grilling operations utilize natural charcoal logs in place of charcoal briquettes. For such operations, it is often desirable to separate or break apart the natural charcoal log into smaller pieces.

Therefore, it is readily apparent that there is a need for a grilling implement and method of use thereof, wherein the grilling implement is suited for removal of a hot grill lid and/or a hot grill grate without causing injury, while maintaining the grill grate level, and/or to permit access below the grill grate to maneuver charcoal briquettes or volcanic rock pieces and/or break apart natural charcoal into smaller pieces.

BRIEF SUMMARY OF THE INVENTION

Briefly described, in a preferred embodiment, the present invention overcomes the above-mentioned disadvantages and meets the recognized need for such a device by providing a grilling implement and method of use thereof, wherein the grilling implement is suitable for extraction of a grill lid and/or grate, and wherein the grilling implement is also suitable for subsequent manipulation of charcoal briquettes or breaking apart a natural charcoal log.

According to its major aspects and broadly stated, the present invention in its preferred form is a grilling implement comprising a body, a handle and a functional end, wherein the functional end comprises a hook and supporting bars. The hook is suited for removal of a grill lid or cover by insertion under the handle of the grill, and further serves to secure a grill grate when inserted between the tines of the grill grate. The supporting bars work in concert with the hook to provide support to the grill grate during removal of same, thereby facilitating maintenance of the grill grate at a level position. After removal, the grill grate can be placed on a level surface and the grilling implement can be utilized for further operations.

The bars of the grilling implement are also suited for positioning of charcoal briquettes within the grill, wherein the bars are of a dimension suited to receive a charcoal briquette without permitting passage of same therethrough. Thus, the charcoal briquette can be maneuvered to, and positioned in, a selected location. Similarly, the bars can be utilized to break apart a natural charcoal log by inserting the bars into fissures in the log and then wedging the portions of the log apart with the grilling implement.

The grilling implement can also be utilized without removal of the grill grate by inserting the hook and bars between the tines of the grill grate, and accessing charcoal and/or rock pieces contained therebelow.

More specifically, the present invention is a grilling implement and method of use, wherein the grilling implement comprises a first end, a body and a second end. The first end comprises a handle, a loop and a tail, with the tail having a hanger disposed thereon. The handle preferably comprises a material having insulating properties, and the body of the implement is formed from a non-combustible material.

The handle frame is disposed over the loop and secures the loop within the handle, thereby permitting manipulation of the grilling implement. Located at the second end are a first bar, a second bar and a hook, wherein the hook comprises a heel, shaft and tip. The heel and shaft are coplanar with the bars, and the tip extends out of, and is raised above, the plane. By insertion of the second end through the tines of a grill grate, the bars and hook can be utilized to secure and stabilize the grill grate, thereby permitting removal of the grill grate while maintaining same in a level position to prevent spillage of food disposed upon the grill grate.

The grilling implement is suited for removal of a lid or cover of a grill, the grilling implement having a hook end that can be inserted under the handle of a grill lid to lift same from a grill, thereby exposing the grill grate with food disposed thereon. The grilling implement can subsequently be inserted between the tines of the grate and rotated such that the bars form a stable platform for support of the grate. The hook can subsequently be looped over the bars to securely hold the grate for lifting from the grill, while maintaining the grill grate in a level position.

Once the grill grate is removed, the grilling implement can be utilized to maneuver charcoal briquettes or to break apart logs of natural charcoal disposed or contained within the basin or trough of the grill. The space between the bars is sized to be less than the least dimension of a charcoal briquette; thereby, enabling ht bars to be placed under a briquette to lift and/or otherwise maneuver the briquette to a selected location. To break apart natural charcoal logs, the bars are inserted into fissures in the charcoal log, and the implement twisted to wedge the portions of the log apart.

In instances where it is desirable to leave the grill grate in position, the hook and bars of the grilling implement can be inserted between the tins of the grill grate to permit maneuvering of coals and/or rocks within the grill.

The grilling implement further comprises a support loop to facilitate hanging the implement over a nail or similar protuberance, or alternately, the implement can be hooked over a suitable support ledge or eye via a hook carried by the loop.

Accordingly, a feature and advantage of the present invention is its ability to safely and securely remove a grill lid from a grill.

Another feature and advantage of the present invention is its ability to safely and securely remove a grill grate from a grill.

Yet another feature and advantage of the present invention is its ability to remove a grill grate while maintaining same in a level position so as to avoid spillage of food items placed thereupon.

Still another feature and advantage of the present invention is its ability to manipulate charcoal briquettes.

Yet another feature and advantage of the present invention is its ability to wedge and break apart natural charcoal or wood into smaller pieces.

Yet still another feature and advantage of the present invention is its ability to be utilized for manipulation of logs and/or breaking apart logs of any firewood materials.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

Figure 1:
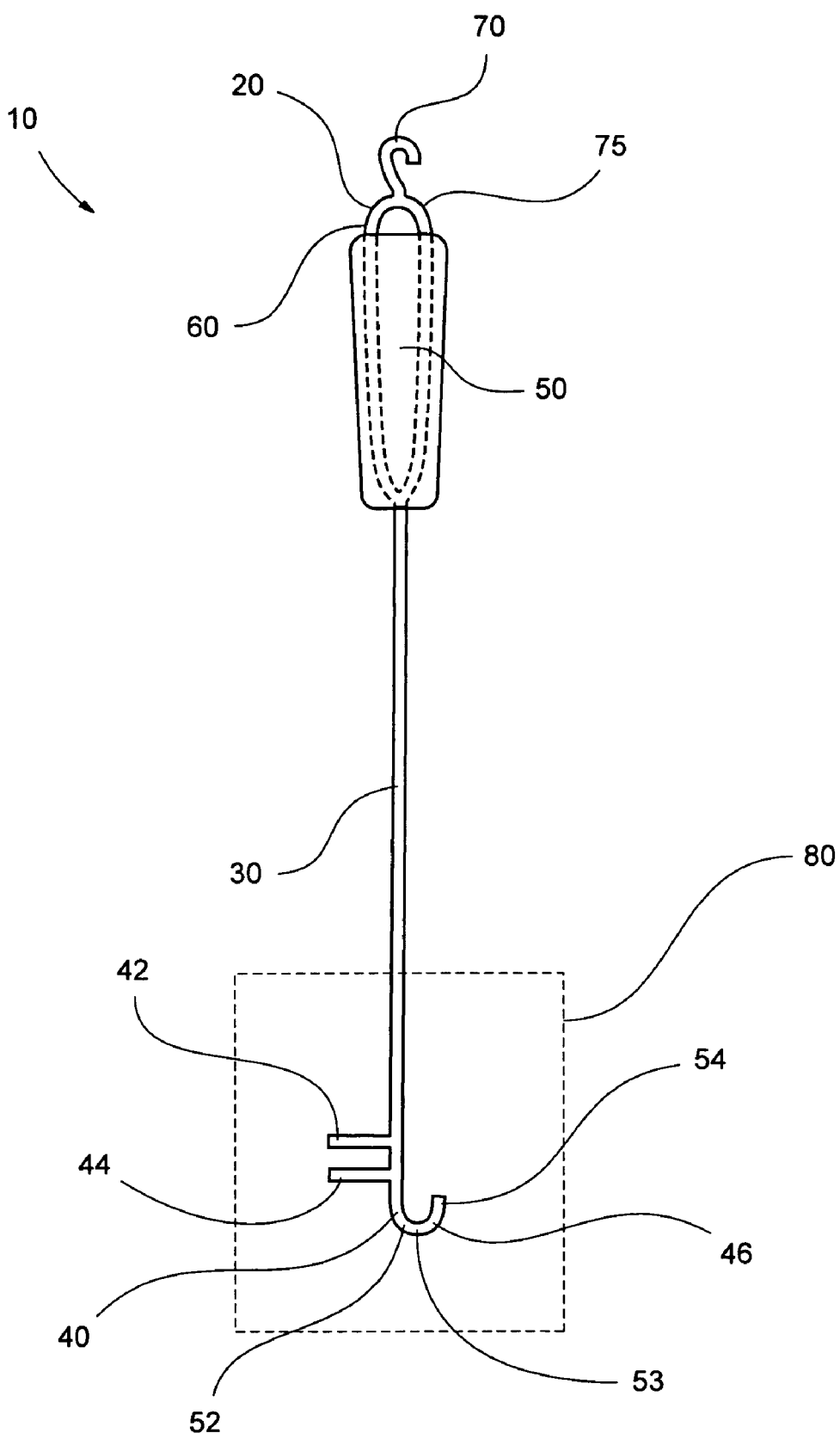
FIG. 1 is a top view of a grilling implement according to a preferred embodiment of the present invention.

In describing the preferred and selected alternate embodiments of the present invention, as illustrated in FIGS. 1–5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–5, the present invention in a preferred embodiment is grilling implement 10, wherein grilling implement 10 preferably comprises first end 20, body 30 and second end 40. First end 20 preferably comprises handle 50, loop 60 and tail 75, wherein hanger 70 is preferably disposed on tail 75. Handle 50 preferably comprises a material having insulating properties, such as, for exemplary purposes only, wood, rubber, and/or plastic, wherein first end 20, second end 40 and body 30 preferably comprise a moldable non-combustible material, such as, for exemplary purposes only, metal.

Handle 50 secures loop 60 therewithin, thus permitting manipulation of grilling implement 10. Second end 40 preferably comprises first straight bar 42, second straight bar 44 and hook 46, wherein hook 46 preferably comprises heel 52, shaft 53 and tip 54. Heel 52 and shaft 53 preferably lie coplanar with bars 42 and 44, wherein heel 52, shaft 53 and first straight bar 42 and second straight bar 44 preferably lie within plane 80, and wherein tip 54 preferably extends out of plane 80.

Figure 2:
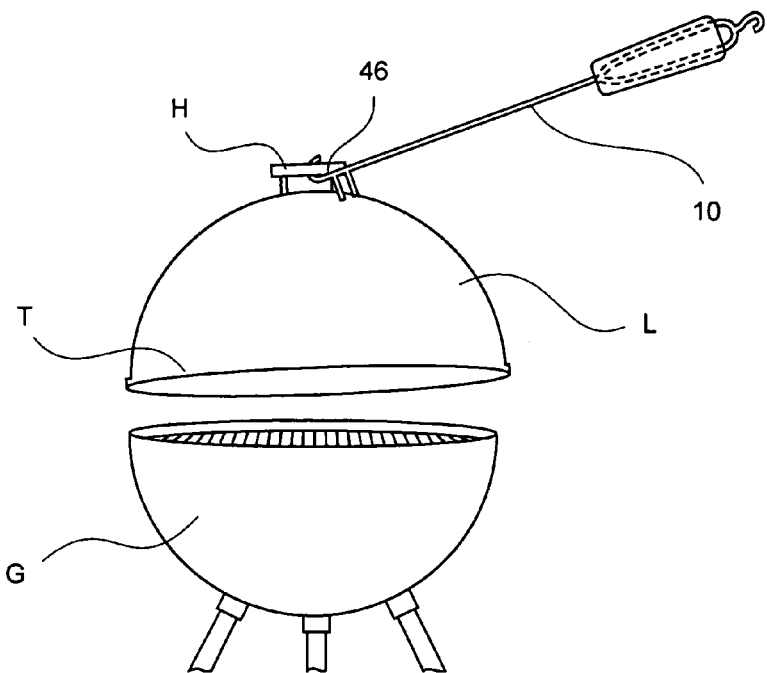
FIG. 2 is a perspective view of a grilling implement according to a preferred embodiment of the present invention, shown in use to raise a grill lid.

Referring now more specifically to FIG. 2, grilling implement 10 is preferably utilized for removing lid L of grill G, wherein hook 46 is preferably inserted under handle H of grill lid L. Once inserted, lifting of grilling implement 10 preferably raises grill lid L, removing same from grill G, thereby exposing grilling surface or grate T disposed therewithin.

Figure 3:
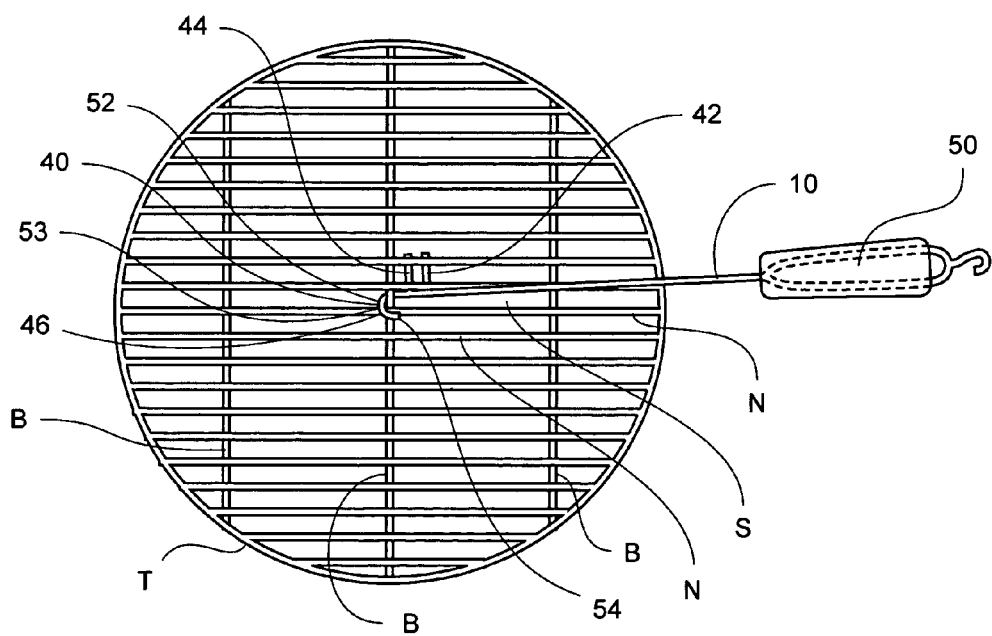
FIG. 3 is a top view of a grilling implement according to a preferred embodiment of the present invention, shown in use to lift a grill grate.

Referring now more specifically to FIG. 3, grilling implement 10 is preferably utilized to remove grate T from grill G, wherein second end 40 of grilling implement 10 is preferably inserted through space S between tines N of grate T, wherein tines N are spaced apart by, and typically welded to, braces B. Handle 50 is preferably utilized to rotate grilling implement 10 to maneuver same, wherein second end 40 is preferably rotated beneath tines N to place first straight bar 42 and second straight bar 44 proximate and beneath tines N. First straight bar 42 and second straight bar 44 thereby preferably form a stable platform for supporting tines N thereon. Hook 46 is preferably concurrently passed beneath tines N, wherein heel 52 and shaft 53 of hook 46 preferably lie below and proximate tines N. Tip 54 of hook 46 is preferably subsequently passed up through tines N, wherein tip 54 preferably passes over brace B to preferably secure grate T for lifting grate T from grill G.

Figure 4:
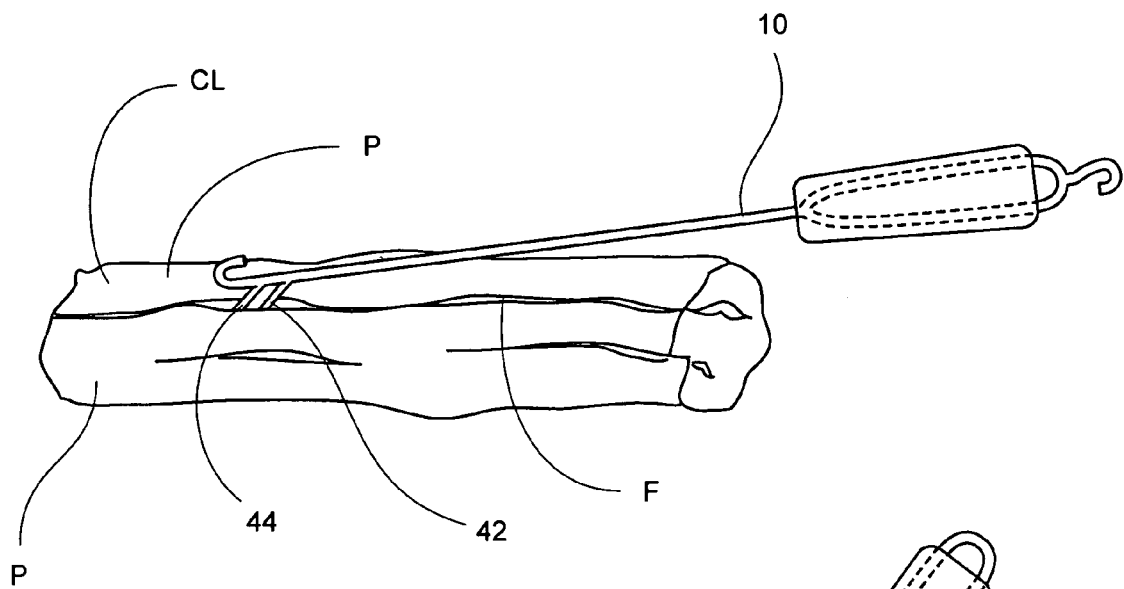
FIG. 4 is a perspective view of a grilling implement according to a preferred embodiment of the present invention, shown in use separating portions of a natural charcoal log; and, FIG. 5 is a perspective view of a grilling implement according to a preferred embodiment of the present invention, shown manipulating a charcoal briquette.

Referring now more specifically to FIG. 4, grilling implement 10 is preferably utilized to separate portions P of natural charcoal log CL, wherein bars 42 and 44 are preferably inserted into fissures F of log CL, whereupon grilling implement 10 is preferably moved laterally to cause separation of portions P from one another.

Figure 5:
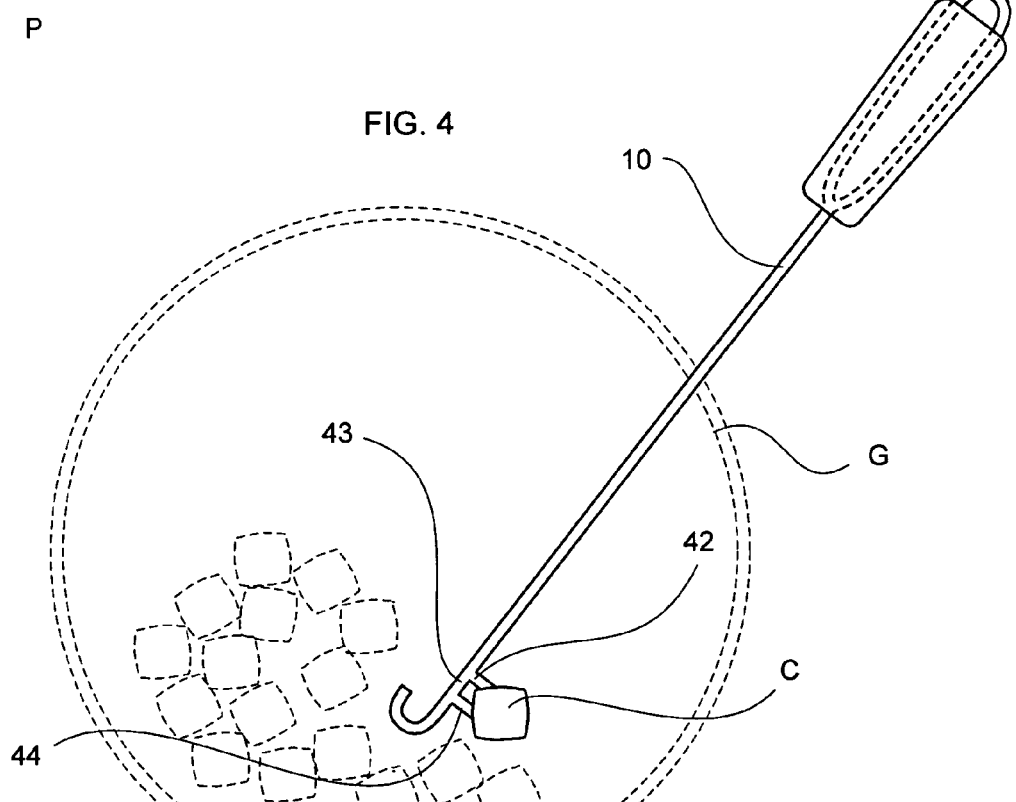

Referring now more specifically to FIG. 5, grilling implement 10 is preferably utilized for maneuvering charcoal briquettes C within grill G. First straight bar 42 and second straight bar 44 are preferably spaced apart by space 43, wherein space 43 is preferably less than the width or length of charcoal briquette C. Due to space 43, grilling implement 10 preferably supports charcoal briquette C while preferably maneuvering same. Since space 43 is less than width or length of briquette C, charcoal briquette C is precluded from passing through space 43, and thus, grilling implement 10 may preferably be utilized to position charcoal briquette C in a selected location within grill G.

When not in use, grilling implement is preferably supported for storage by placement of loop 60 over a protuberance, such as a nail in a wall, or alternately, hanger 70 can be hooked over a suitable support ledge or eye.

In operation, grilling implement 10 is utilized to remove lid L from grill G by inserting hook 46 under handle H and lifting lid L from grill G. Upon removal of lid L, first end of grilling implement 10 can be inserted between tines N of grill grate T. Grilling implement 10 is then rotated such that bars 42, 44 are located proximate tines N and hook 46 loops over brace B. Grill grate T is then removed while maintaining support via bars 42, 44 and security via hook 46. Upon removal, grill grate T is placed on a selected surface and grilling implement 10 can be utilized for other operations, such as maneuvering coals within grill G and/or breaking apart charcoal log CL, as described above.

It is contemplated in an alternate embodiment of the present invention that body 20 and loop 60 of grilling implement 10 could be unitarily formed from a stamped, cast, or forged piece of metal, or other suitable non-combustible material.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A grilling implement comprising:
   means for manipulating a selected object, said means comprising at least two straight bars lying parallel to one another;
   at least one hook comprising a base, a shaft and a tip; and
   a body comprising a first end and a second end, wherein said at least one hook is disposed at said second end of said body, and wherein said at least two straight bars are disposed normal to said body at said second end thereof, and wherein said at least one hook extends directionally opposite from said at least two bars, and wherein said base and said shaft of said at least one hook lie substantially coplanar with said means for manipulating and said body, and wherein said tip of said hook curves out of the plane formed by said means for manipulating, said base, said shaft and said body.

2. The grilling implement of claim 1, further comprising a handle disposed at said first end of said body.

3. The grilling implement of claim 1, wherein said grilling implement further comprises a means for hanging.

4. The grilling implement of claim 3, wherein said means for hanging is selected from the group consisting of a loop, a hook, and combinations thereof.

5. The grilling implement of claim 1, wherein said at least two straight bars are dimensioned to substantially receive a charcoal briquette.

6. The grilling implement of claim 1, wherein said at least two straight bars are configured to separate a charcoal log.

7. The grilling implement of claim 1, wherein said at least one hook is adapted to receive the handle of a grill lid, whereby the lid can be removed from a grill.

8. A grilling tool comprising:
   a body and an end;
   two straight parallel bars extending normal to said body and disposed thereon proximate said end; and
   a hook disposed on said end opposite said two straight parallel bars, wherein said hook comprises a tip, a shaft and a base, and wherein said tip departs from a plane comprising said two straight parallel bars, said body, said end, and said shaft and said base of said hook.

9. The grilling tool of claim 8, further comprising a hanger.

10. A grilling implement comprising:
    a first elongated member;
    second and third straight parallel members disposed on said first elongated member at an end thereof, and coplanar with and perpendicular to said first elongated member; and
    a hook disposed at an end of said first elongated member opposite said second and third straight members, wherein said hook comprises a tip, a shaft and a base, and wherein said tip departs from a plane comprising said two straight parallel members, said first elongated member, and said shaft and said base of said hook.

* * * * *